(12) United States Patent
Klug et al.

(10) Patent No.: US 6,894,815 B1
(45) Date of Patent: May 17, 2005

(54) REFERENCE BEAM ABSORBERS-BLOCKERS

(75) Inventors: Michael A. Klug, Austin, TX (US); Deanna McMillen, Huntsville, AL (US); Qiang Huang, Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 10/154,497

(22) Filed: May 24, 2002

Related U.S. Application Data (60) Provisional application No. 60/293,670, filed on May 25, 2001.

(51) Int. Cl.[7] ................................................ G03H 1/02
(52) U.S. Cl. ............................... 359/28; 359/30; 359/1; 359/35
(58) Field of Search ........................... 359/1, 22, 23, 359/28, 30, 31, 35; 430/1, 2

(56) References Cited

U.S. PATENT DOCUMENTS

| | | | |
|---|---|---|---|
| 4,783,133 A | * 11/1988 | Chen | 359/23 |
| 5,254,388 A | 10/1993 | Melby et al. | 428/120 |
| 5,870,224 A | 2/1999 | Saitoh et al. | 359/456 |
| 6,185,038 B1 | * 2/2001 | Yamaguchi et al. | 359/457 |
| 6,236,475 B1 | * 5/2001 | Kihara et al. | 359/23 |
| 6,369,920 B1 | * 4/2002 | Klug | 359/15 |
| 6,449,067 B2 | * 9/2002 | Shirakura et al. | 359/35 |

FOREIGN PATENT DOCUMENTS

| | | | |
|---|---|---|---|
| JP | 1-210-922 A | 8/1989 | 359/17 |
| JP | 4-294316 A | 10/1992 | 359/22 |

OTHER PUBLICATIONS

Masahiro Yamaguchi, Hideaki Endoh, Toshio Honda and Nagaaki Ohyama, "High–Quality Recording Of A Full Parallax Holographic Stereogram With A Digital Diffuser," *Optics Letters*, vol. 19 No. 2, Jan. 15, 1994, pp. 135–137.

(Continued)

*Primary Examiner*—Thong Nguyen
*Assistant Examiner*—Arnel C. Lavarias
(74) *Attorney, Agent, or Firm*—Campbell Stephenson Ascolese LLP; Marc R. Ascolese (57) ABSTRACT

In accordance with teachings of the present invention, a device accomplishes the task of reducing or preventing reflections of the reference beam off a diffuser from striking the holographic recording material. First, the device absorbs a large percentage of the reference beam power so that portion of the reference beam never reaches the diffuser. Second, the device blocks the small amount of reference beam that is incident on the diffuser and reflects back toward the film. Thus, the proposed device operates as an absorber-blocker (AB) for the reference beam.

18 Claims, 7 Drawing Sheets

OTHER PUBLICATIONS

Masahiro Yamaguchi, Takahiro Koyama, Hideaki Endoh, Nagaaki Ohyama, Susumu Takahashi and Fujio Iwata, "Development Of A Prototype Full–Parallax Holoprinter," *Proc SPIE.*, vol. 2406 *"Practical Holography IX,"* Apr., 1995, pp. 50–56.

Michael A. Klug, Michael W. Halle, Mark Lucente, Wendy J. Plesniak, "A Compact Prototype One–Step Ultragram Printer," *To Appear in SPIE Proc.*, vol. 1914 *"Practical Holography VII: Imaging and Materials"* (SPIE,. Bellingham, WA, Feb. 1993) paper #3 (in press), pp. 1–10.

Michael A. Klug, Michael W. Halle, Paul M. Hubel, "Full Color Ultragrams," *To Appear in SPIE Proc.*, vol. 1667 *"Practical Holography VI"* (SPIE, Bellingham, WA, Feb. 1992) paper #12 (in press), pp. 1–10.

Michael W. Halle, Stephen A. Benton, Michael A. Klug, John S. Underkoffler, "The Ultragram: A Generalized Holographic Stereogram," *To Appear in SPIE Proc.*, vol. 1461 *"Practical Holography V"* (SPIE,. Bellingham, WA. Feb. 1991) paper #21 (in press), pp. 1–14.

* cited by examiner

REFERENCE BEAM ABSORBERS-BLOCKERS

This application claims the benefit under 35 U.S.C. § 119 (e) of U.S. Provisional Application No. 60/293,670, entitled "Reference Beam Absorber-Blockers," naming Michael A. Klug, Deanna McMillen, and Qiang Huang as inventors, filed on May 25, 2001. The above-referenced provisional application is hereby incorporated by reference herein in its entirety.

FIELD OF THE INVENTION

The present invention relates in general to the field of hologram production and display and, more particularly, to devices for diverting at least a portion of a reference beam from impinging upon a diffuser disposed adjacent to holographic recording material.

BACKGROUND OF THE INVENTION

One-step hologram (including holographic stereogram) production technology has been used to satisfactorily record holograms without the traditional step of creating preliminary holograms. Both computer image holograms and non-computer image holograms may be produced by such one-step technology. In some one-step systems, computer processed images of objects or computer models of objects allow the respective system to build a hologram from a number of contiguous, small, elemental pieces known as elemental holograms or hogels. To record each hogel on holographic recording material, an object beam is typically directed through the a spatial light modulator (SLM) displaying a rendered image and interfered with by a reference beam. Examples of techniques for one-step hologram production can be found in the U.S. Pat. No. 6,330,088 entitled "Method and Apparatus for Recording One-Step, Full-Color, Full-Parallax, Holographic Stereograms," and naming Michael A. Klug, Mark E. Holzbach, and Alejandro J. Ferdman as inventors, which is hereby incorporated by reference herein in its entirety.

In many holographic recording systems, and particularly in one-step reflection holographic recording systems, a diffuser is used to evenly distribute light in the object beam on to the holographic recording material. For example, a vertical diffusing element (VDE) can be used to spread light vertically in order to increase the vertical viewzone size (e.g., increase the vertical viewing angle) for horizontal-parallax-only (HPO) holographic stereograms. Typically, the diffuser is an anisotropic diffuser. The VDE's function is to provide an anisotropic diffusion plane on which the horizontal image components are focused. The function of the VDE can be accomplished with a lenticular lens array, an interferometric holographic diffuser, a diffractive grating, a specifically designed holographic optical element (HOE) or a combination of these.

Figure 1A:
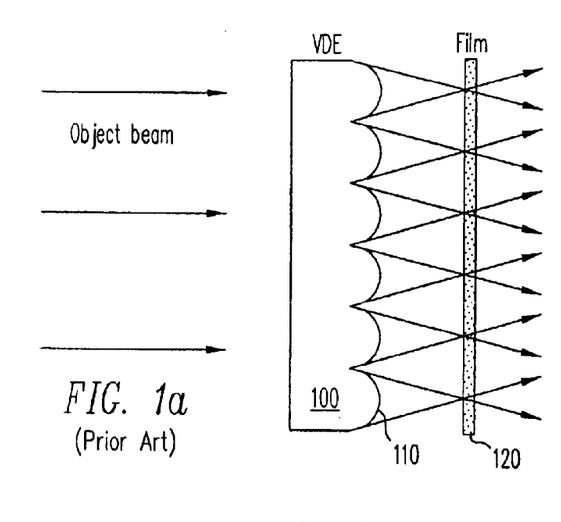
FIGS. 1A–1B illustrate problems associated with the respective locations of a diffuser and a holographic recording material.
Figure 1B:
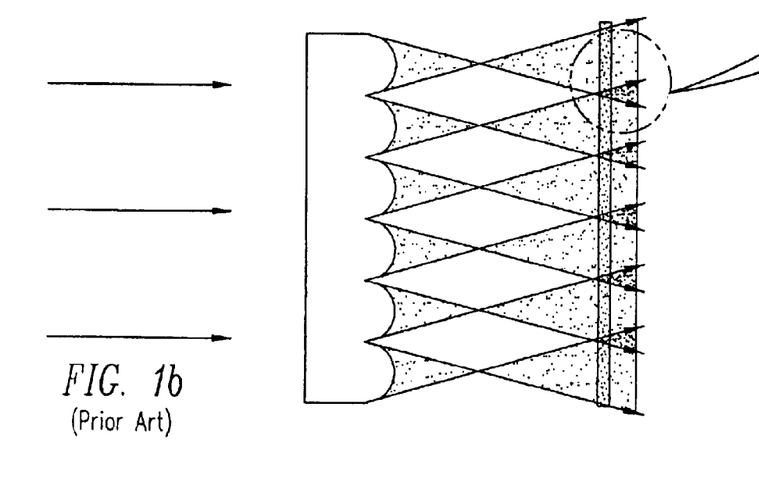

Typically, the VDE is placed in close proximity to the holographic recording material (e.g., holographic film) during exposure in order to locate the vertical focus of the hologram either on the hologram plane or as close as possible to the hologram plane. The VDE can also be image relayed to the hologram plane with an appropriate object beam lens system. Generally, it is more effective to physically place the VDE in contact or nearly in contact with the holographic recording material since this tends to provide larger viewing angles. The close proximity of the VDE to the holographic recording material also reduces artifacts that may arise due to low frequency speckle interference between neighboring diffusion elements. FIG. 1A illustrates the situation where the holographic recording material is placed close to the VDE. In this example where the VDE is a lenticular array 100, the VDE is located so that foci of the lenticules (110) making up lenticular array 100 coincide with holographic recording material 120. Thus, if the VDE is placed close enough to the hologram plane, the speckle artifacts are minimized because the light propagating through the VDE element forms a hologram before it can interfere with light from a neighboring VDE element. FIG. 1B illustrates the situation where the VDE is located further from the holographic recording material, thereby giving rise to the aforementioned image artifacts. As seen from detail 130, overlapping light from adjacent lenticules creates an area of interference leading to spurious gratings and low frequency speckle.

Figure 2:
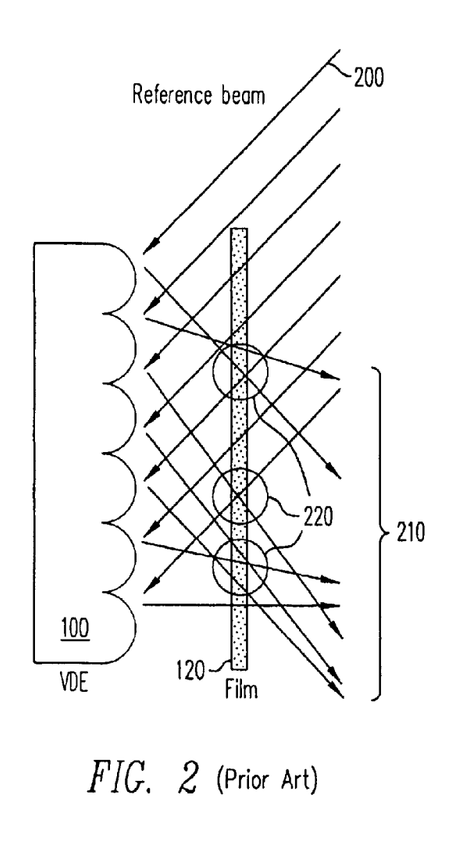
FIG. 2 shows the problem of reference beam reflection by a diffuser.

In recording a reflection hologram, the reference beam and the object beam are directed at the holographic recording material from the opposite sides of the material. Because of the proximity of the diffuser to the holographic recording material and the relative transparency of the holographic recording material, the reference beam passes through the holographic recording material and impinges upon the surface of the diffuser. Thus, placement of the VDE in close proximity to the holographic recording material exposes the VDE to reference beam light that is transmitted through the film from the side opposite of that to which the reference beam is directed. This situation is illustrated in FIG. 2. During hologram recording, the reference beam light 200 is reflected off the VDE elements (typically at a variety of angles) 210 and is recorded as unwanted noise gratings 220 in holographic recording material 120. Thus, the surface of diffuser 100 typically reflects light from the reference beam back through the holographic recording material a second time.

The reflected light from the reference beam can be reflected such that it interferes with the reference beam as it traverses the holographic recording material. Light from the reference beam passes through the holographic recording material and is reflected by the VDE as reflected reference beam portions. An interference pattern corresponding to the reflected light is recorded in the holographic recording material, resulting in an undesirable artifact that resembles a vertical line seemingly positioned infinitely deep with respect to the hologram plane. This results from the recording of a single beam hologram of the diffuser surface. This artifact is both distracting to the viewer of the resulting hologram and damaging to the diffraction efficiency of the holographic recording material, thereby effecting brightness of the image. Additionally, reflected light from the reference beam can be reflected such that it interferes with the object beam, potentially creating additional unplanned interference patterns that are recorded in the holographic recording material. While in principle, those recorded interference patterns are similar to the interference patterns that are intended to be recorded (i.e., the interference pattern created by the original, un-reflected, reference beam and the object beam), the fact that the interference patterns were formed using light reflected from the reference beam means that additional distortion or unwanted artifacts may be present.

A number of strategies have been used to reduce and/or eliminate the problem of interaction between the reference beam and the diffuser. One solution is to place an anti-reflection coating on the diffuser surface. However, anti-reflective coatings usually are effective only for particular bandwidths of wavelengths and certain angles of incidence of incoming light. Due to the extreme and varied angles at which a reference beam may strike a diffuser and due to the fact that some diffusers are volumetric devices that have no surface relief, this technique has not proven successful. In practice, anti-reflective coatings typically eliminate only about 30% of reflected reference beam light, whereas to eliminate the artifacts described above a greater percentage of the reflected reference beam light should be eliminated. Furthermore, anti-reflective coatings are difficult to uniformly apply over large areas such as the surface area of a diffuser, can be fragile, and can be very costly.

Figures 3A, 3B:
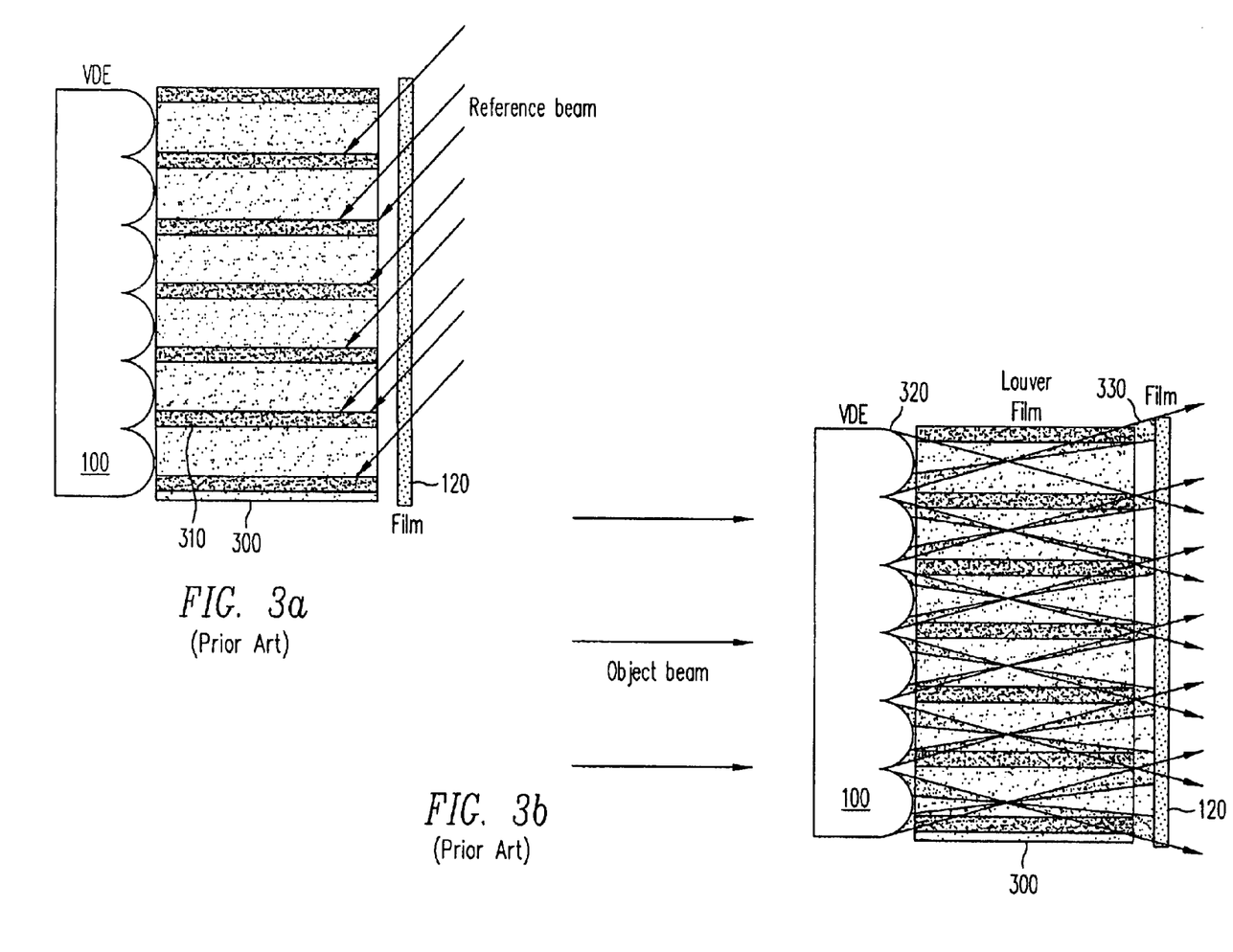
FIGS. 3A–3B show a prior art reference beam deflection solution using louver screen film.

Another technique is the use of a light control or "louver screen" film between the diffuser and the associated holographic recording material. As illustrated in FIG. 3A, light from the reference beam passes through the holographic recording material and impinges upon louver screen film 300, where the light is absorbed, and/or generally prevented from reflecting back toward the reference beam by microlouvers within the film. The object beam (not shown) passes through the VDE and, because of the structure of the louvers 310, generally passes through the louver screen film. Louver screen film is a commercially available (e.g., Light Control Film from 3M™) volumetric substrate that typically contains microscopic opaque strips or louvers, arranged in a parallel formation at a selected variable angle analogous to a venetian blind arrangement. Louver screen film is chosen with a particular louver spacing and angle that allows passage of the object beam light, for example, at angles of zero to plus or minus thirty degrees (±30°), while absorbing reference beam light incident at higher angles of, for example, approximately forty five degrees (45°). Such louver screen film successfully prevents reference beam light from striking and reflecting off the surface of diffuser 100, and thus eliminates the unwanted artifacts.

One problem associated with using louver screen film is the film's requisite thickness (on the order of 1 mm) which necessarily further separates the diffuser from the surface of the holographic recording material. FIG. 3B illustrates a situation where the thickness of louver film 300 limits the amount of diffused object beam light that arrives at the holographic recording material. For example, while ray 320 successfully traverses louver film 300, ray 330 does not. Because the louver screen film separates the diffuser and holographic recording material, the diffuser plane and the hologram plane are not as close together as is possible, which leads to poorer quality recorded holograms. Louver screen film may also introduce other artifacts into the hologram due to the film's periodicity and diffractive effects associated with the passage of light through the narrow louvers of the film. Additionally, it can be difficult to match the pitch of the louver film with the pitch of the lenticules in VDE 100, and to properly register the two devices. Finally, louver film often absorbs a significant percentage of the object beam light, again due to the existence of louvers within the film material, along with intrinsic substrate and surface absorption and reflection.

Yet another solution is to use a specially designed holographic optical element, in place of the louver film, that diffracts the unwanted reference beam light away from the holographic recording material. Examples of such devices can be found in the U.S. Pat. No. 6,369,920 entitled "Reference Beam Deflecting Element for Recording a Hologram," naming Michael A. Klug as the inventor, which is hereby incorporated by reference herein in its entirety.

Nevertheless, it is desirable to have new devices to reduce or prevent reflections of the reference beam off the VDE from striking the holographic recording material. Such devices overcome the deficiencies of the prior art, including for example, the thickness, efficiency, and ease of construction and use.

SUMMARY OF THE INVENTION

In accordance with teachings of the present invention, a device accomplishes the task of reducing or preventing reflections of the reference beam off a diffuser from striking the holographic recording material. First, the device absorbs a large percentage of the reference beam power so that portion of the reference beam never reaches the diffuser. Second, the device blocks the small amount of reference beam that is incident on the diffuser and reflects back toward the film. Thus, the proposed device operates as an absorber-blocker (AB) for the reference beam.

Accordingly, one aspect of the present invention provides a system for recording a hologram in a holographic recording material, the holographic recording material having at least a portion including a first surface and a second surface. The system includes a diffuser and an absorber-blocker. The diffuser is disposed adjacent to the second surface whereby an object beam directed at the second surface can pass through the diffuser prior to contacting the holographic recording material. The absorber-blocker disposed between the second surface and the diffuser to prevent at least a portion of a reference beam directed at the first surface from impinging on the diffuser.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of the best contemplated mode for carrying out the invention. The description is intended to be illustrative of the invention and should not be taken to be limiting.

Figure 3C:
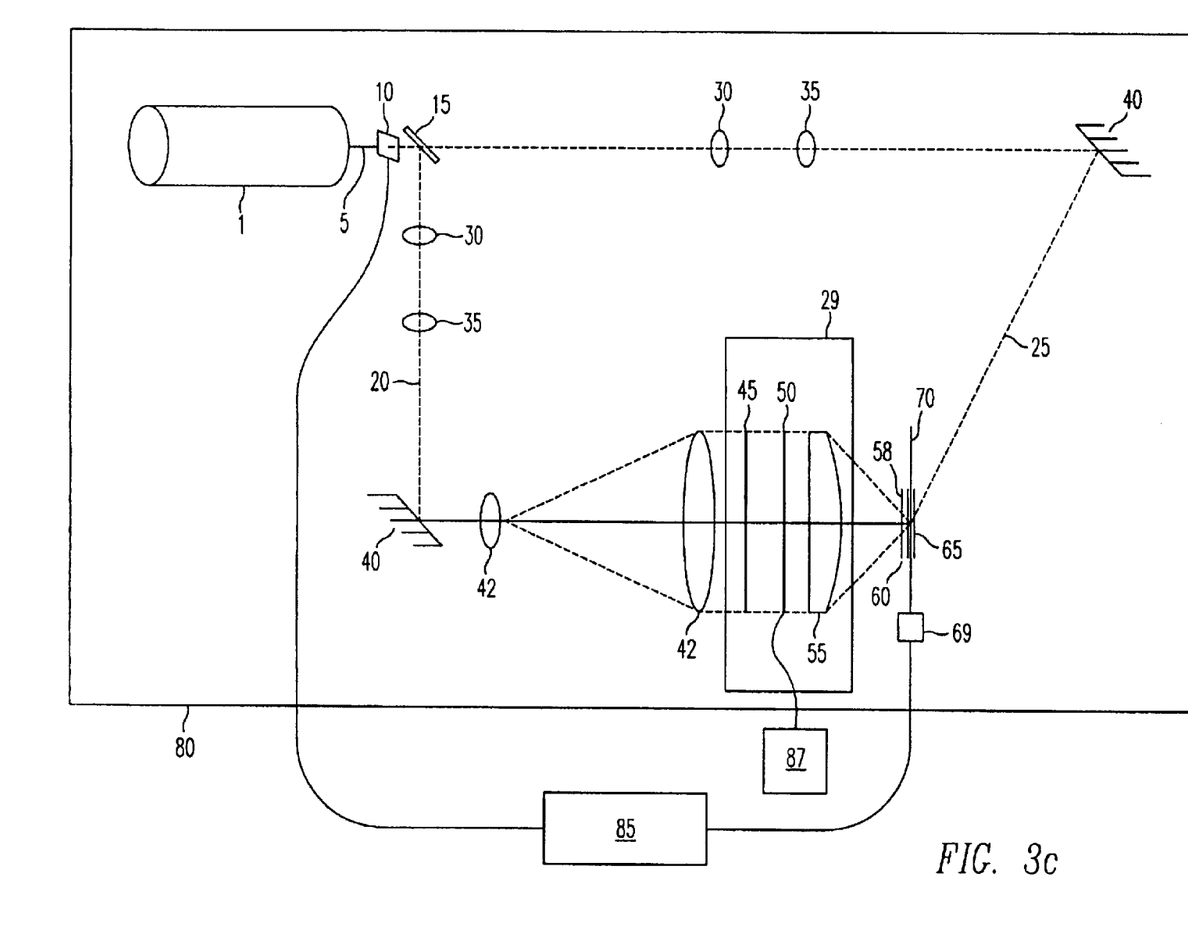
FIG. 3C illustrates an example of a system for producing one-step, monochromatic, holographic-stereograms.

FIG. 3C illustrates a simplified example of a system (e.g., a holographic printer) for producing one-step, monochromatic, holographic-stereograms. Typically, holographic printers like that depicted in FIG. 3C include a monochromatic coherent light source such as laser 1, lenses 42, mirrors 40, and optical system 29, a shutter 10, a mechanism for translating holographic recording material 69, holographic recording material 70, usually in the form of film, a computer 85 for controlling the timing of an exposure sequence, and a separate high-speed computer 87 for image calculations.

The holographic printer of FIG. 3C is typically supported by a vibration isolation table 80. Shutter 10 is located at the output of laser 1, and beam-splitter 15 splits beam 5 into an object beam 20 and a reference beam 25. The polarizations of the object and reference beams are typically adjusted by a pair of half-wave plates 30 and a pair of polarizers 35. The half-wave plates 30 and the polarizers 35 can also be adjusted to control the ratio of the intensity of the two beams 20 and 25. A number of mirrors 40 are used to steer beams 20 and 25 as necessary, while lens 42 serves to expand the object beam prior to introduction into optical system 29.

Optical system 29 includes a diffuser 45, typically a band-limited diffuser, or an anisotropic diffuser, a liquid crystal display (LCD) panel 50, and a converging lens 55. LCD panel 50 receives image data calculated by a high-speed computer 87 via an analog or digital signal. LCD panel 50 serves as a spatial light modulator for light passing through the panel. Converging lens 55 focuses images from LCD panel 50 to the holographic recording material 70, through diffuser 58 and holographic deflector 60. Holographic deflector 60 is a holographic optical element designed to "deflect" light from the reference beam. Specifically, at least one of a variety of particular interference patterns is recorded in holographic deflector 60 so that light from the reference beam 25 is diffracted in a preferred direction. Thus, holographic deflector 60 includes one or more holograms that are constructed so that when they are illuminated by a light source such as reference beam 25, light is preferentially deflected. To prevent the exposure of parts of the holographic recording material 70 that are not part of the elemental hologram meant to be exposed, an object beam masking plate (not shown) can be used. Similarly, reference beam masking plate 65 serves to prevent unwanted exposure of parts of the holographic recording material.

Although the present invention will be discussed in the context of simple monochromatic hologram production systems, those having ordinary skill in the art will readily recognize that the principles disclosed herein can be extended to multi-color hologram production systems, such as those disclosed in the aforementioned U.S. Pat. No. 6,330,088.

Figures 4A, 4B:
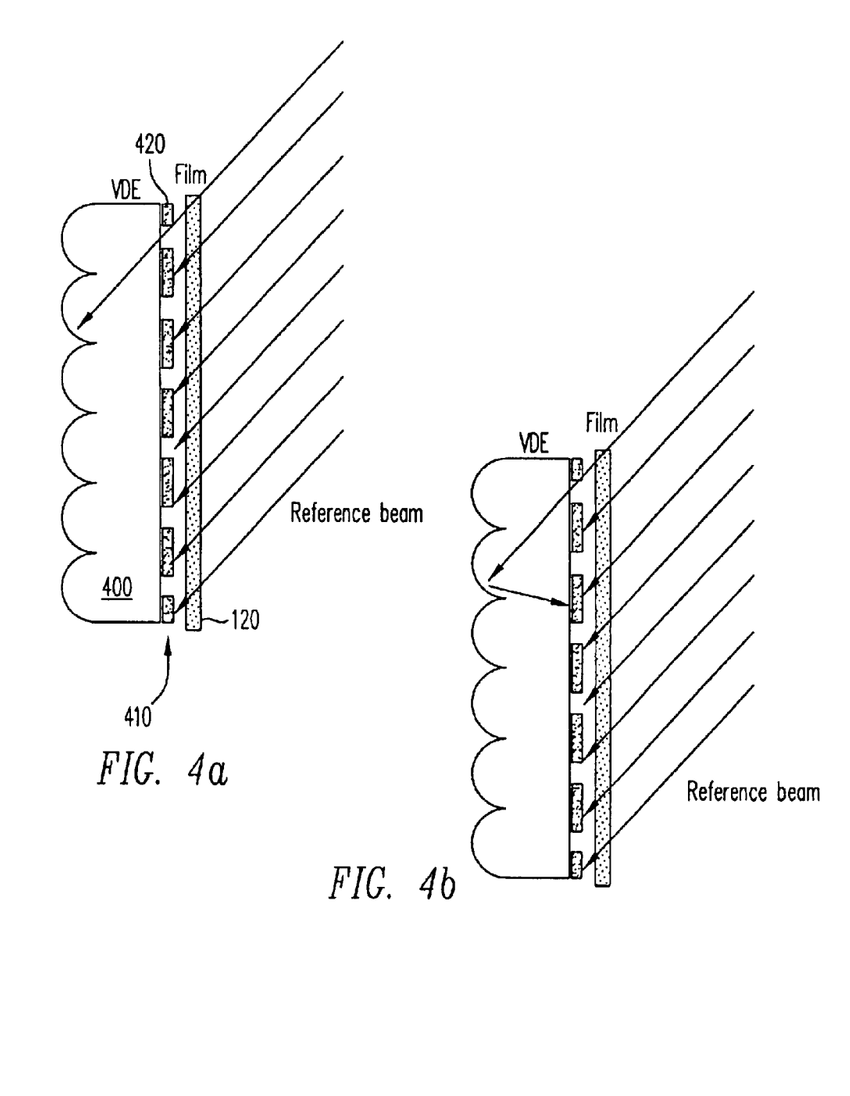
FIGS. 4A–4B illustrate the operation of one embodiment of the present invention where the absorber-blocker is formed on the diffuser.

FIGS. 4A–4B illustrate the operation of one embodiment of the present invention where the absorber-blocker 410 is formed on the diffuser 400. In this example, diffuser 400 is a VDE constructed from a lenticular array. The absorber-blocker material is located on the flat side of VDE 400, and is laid out so as to allow substantially all of the diffused light from the object beam (not shown) to pass between absorber-blocker material elements 420. For example, if the thickness of VDE 400 and the design of the VDE's lenticules is such that object beam light is focussed to points at or near the flat side of the VDE, the absorber-blocker material can absorb most of the reference beam light that passes through the holographic recording material, while still allowing most of the object beam light to pass through as well. Note that FIG. 4A illustrates the situation where some reference beam light does pass into VDE 400, either through the spaces between absorber-blocker elements, or perhaps through absorber-blocker elements that are not completely absorbing/blocking. Such light, as shown in FIG. 4B, can be reflected or scattered back toward the absorber-blocker, but will typically be prevented from impinging upon the holographic recording material by one or more absorber-blocker material elements. Preventing these types of reflections from the VDE reduces the amount and severity of VDE-related artifacts recorded in the holographic recording material.

The effectiveness and utility of the absorber-blocker generally depends upon three properties. First, the absorber-blocker does not interfere with, block, or otherwise change the object beam. Second, the absorber-blocker nearly eliminates any reference beam reflections from striking the holographic recording material. Third, the absorber-blocker allows the desired close proximity of the VDE and the holographic recording material.

The absorber-blocker design typically includes a thin layer of material that is strongly absorptive at the wavelengths being used for holographic recording. Such materials include absorptive inks, paints and coatings, as well as photoactive materials (e.g. photographic films and emulsions) that have been exposed so as to be absorptive. Additionally, the absorber-blocker layer is fabricated in such a pattern that the absorbing material exists only where the object beam will not be incident on the layer and will not exist where the object beam is incident upon the layer. The placement of the absorber-blocker layer between the VDE and the holographic recording material is chosen to be at or very near the plane where the object beam is incident on the smallest area of any plane between the VDE and film. As illustrated in FIGS. 4A and 4B, that plane can be at or near the back side of a lenticular array when that side coincides with the focal plane of a lenticular used as the VDE. Similarly, the plane of minimum object beam area would typically be the surface, or very near the surface, of the VDE when using an interferometric holographic diffuser or diffractive grating.

Figure 5A:
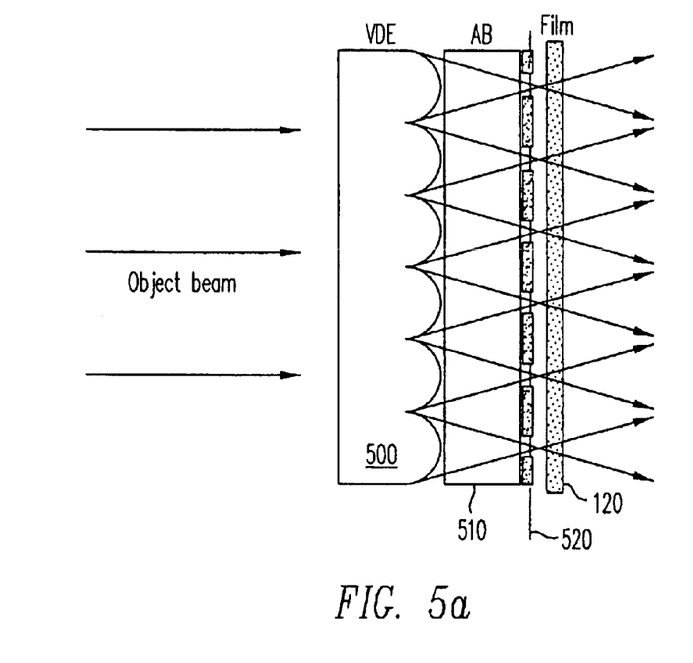
FIGS. 5A–5B illustrate the operation of another embodiment of the present invention where the absorber-blocker is formed on a separate substrate.
Figure 5B:
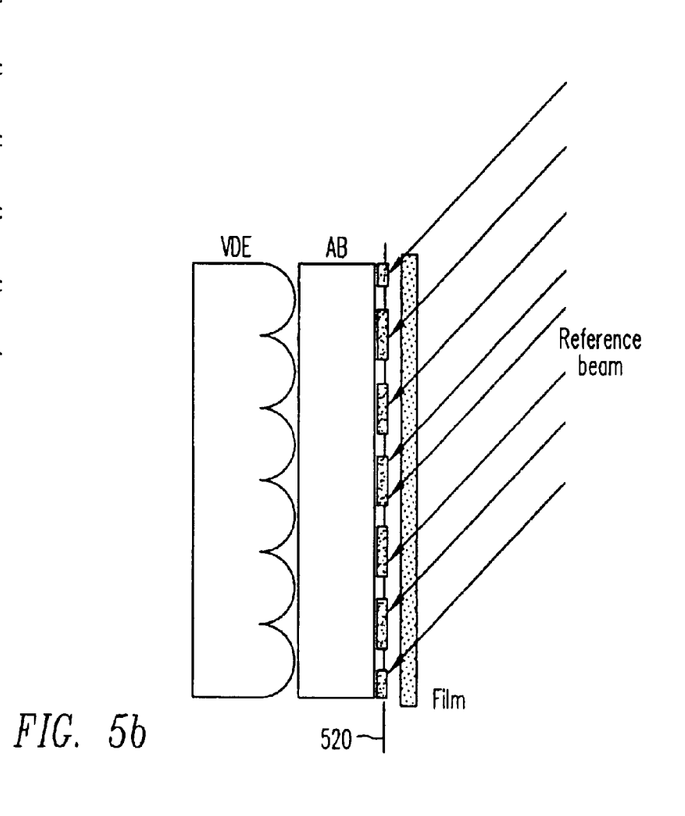

FIGS. 5A and 5B illustrate another example where a lenticular array 500 is used as a VDE, albeit in a flipped orientation. Here, absorber-blocker 510 is located on a separate substrate, typically made from a transparent glass or plastic so as to have minimal effect on transmitted light and provide adequate dimensional stability. The location of the absorber-deflector is preferably chosen to coincide with the plane of minimum object beam area 520 defined by the foci of the lenticules making up lenticular array 500. The embodiment of FIGS. 5A and 5B are particularly useful where the VDE's plane of minimum object beam area is not located on a surface of the VDE (as is often the case with "off-the-shelf" VDEs) or where some other aspect of the VDE is not conducive to the formation of absorber-blocker elements directly on the VDE. FIG. 5B illustrates the effect of absorber-blocker 510 on an incident reference beam.

Figure 6A:
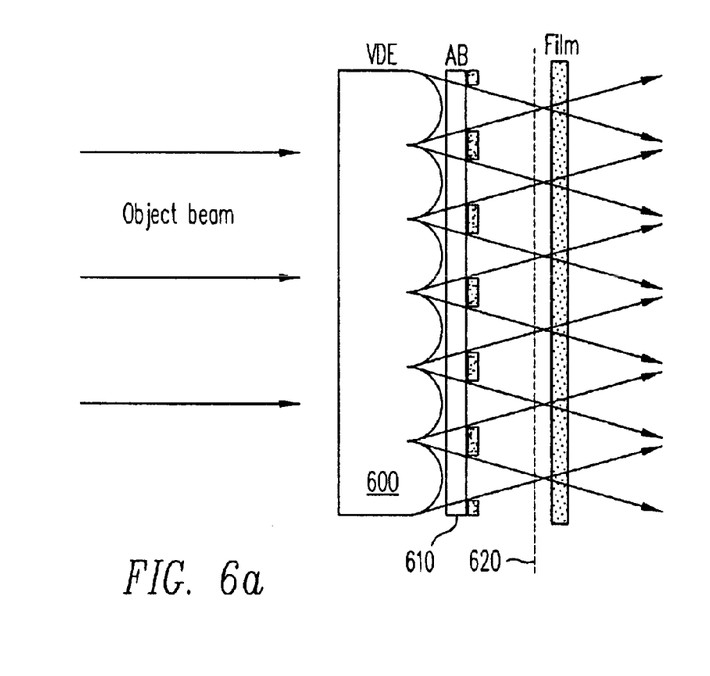
FIGS. 6A–6B illustrate the operation of yet another embodiment of the present invention where the absorber-blocker is formed on a separate substrate.
Figure 6B:
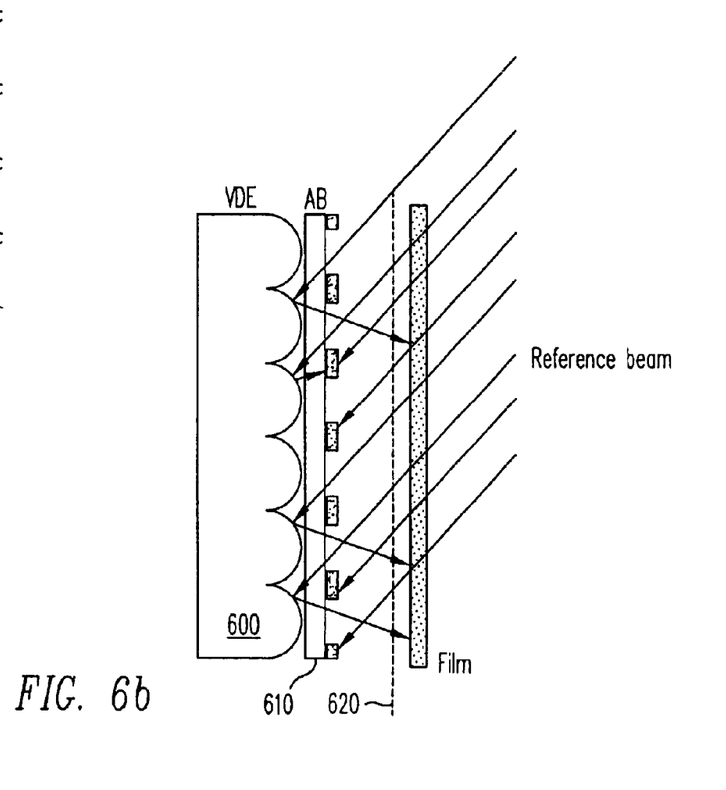

Placing an absorber-blocker 610 at a plane other than the plane of minimum object beam area 620 results in a less effective absorber-blocker that might allow a small amount of reference beam to be reflected off VDE 600 and be incident upon the film, as illustrated in FIGS. 6A and 6B. Additionally, using absorber-blockers that cannot be located at the plane of minimum object beam area (perhaps because of some systematic limitation) may necessitate reducing the size of absorber-blocker elements to ensure that adequate object beam light passes through to the holographic recording material. Nevertheless, such off the plane of minimum object beam area absorber-blockers can be advantageously used in holographic production systems.

Figure 7A:
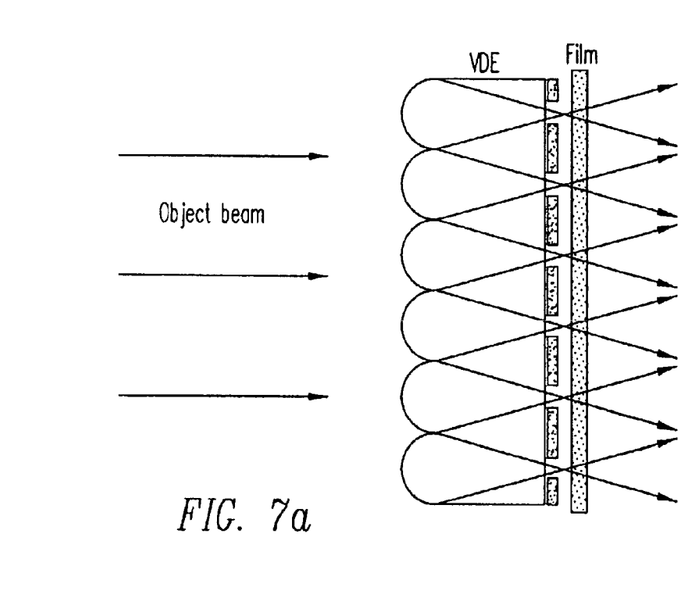
FIGS. 7A–7B shows several alternate embodiments of the absorber-blocker.
Figure 7B:
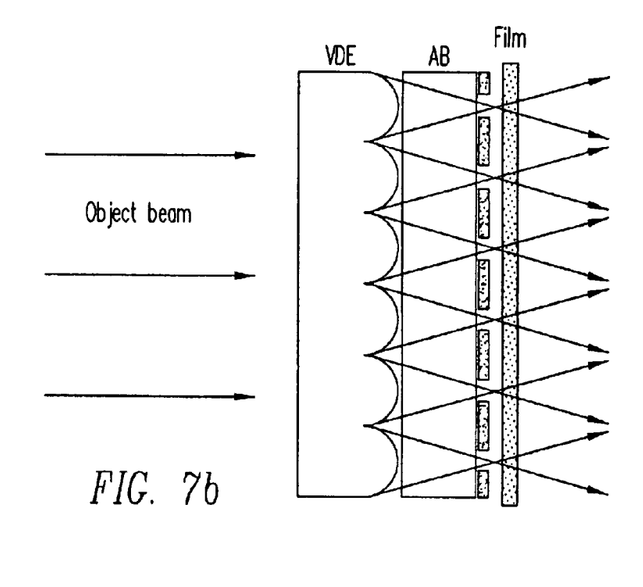

FIGS. 7A and 7B illustrate examples of absorber-blockers located at or near the plane of minimum object beam area.

Formation of the absorber-blocker elements can be accomplished using a variety of techniques, as will be well known to those having ordinary skill in the art. For example, absorber-blocker elements can be formed using established photolithographic techniques. Alternately, the absorber-blocker elements can be formed by exposing photoactive materials (e.g., photographic films, polymers, emulsions, etc.) and then processing the material accordingly. In particular, the VDE to be used with the absorber-blocker can be used to form the exposed areas in a photoactive material that is then processed appropriately. Using the designated VDE can make it easier to form absorber-blocker elements that match the pitch of the VDE, are located in the plane of minimum object beam area, and are properly registered with the VDE.

As mentioned previously, the vertical diffusers provide the vertical view zone for horizontal-parallax-only (HPO) holograms. Since hologram printers for producing HPO holograms use cylindrical lenses to produce an angular view zone along the horizontal orientation of the hologram, the vertical orientation of the cylindrical lenses typically have no power. Thus in the vertical direction, a collimated object beam propagates without any divergence. If no vertical diffuser is installed in the printer, holograms produced by the printer would show a vertically truncated image along a narrow horizontal line.

Although the disclosed embodiments have been described in detail, it should be understood that various changes, substitutions and alterations can be made to the embodiments without departing from their spirit and scope. In particular, those having ordinary skill in the art will readily recognize additional types of diffusers, absorptive materials, substrates, optical elements, and techniques for constructing same, which can be used as part of the present invention.

What is claimed is:

1. A system for recording a hologram in a holographic recording material, the holographic recording material having at least a portion including a first surface and a second surface, the system comprising:
    a diffuser disposed adjacent to the second surface whereby an object beam directed at the second surface can pass through the diffuser prior to contacting the holographic recording material; and
    an absorber-blocker disposed between the second surface and the diffuser to prevent at least a portion of a reference beam directed at the first surface from impinging on the diffuser, the absorber-blocker including:
        a plurality of absorber-blocker material elements wherein at least one of the plurality of absorber-blocker material elements is a thin layer of material having a first absorber-blocker surface and a second absorber-blocker surface, and wherein the first absorber-blocker surface and the second absorber-blocker surface are in respective planes that are substantially parallel to a plane defined by the diffuser.

2. The system of claim 1, wherein the absorber-blocker is operable to allow approximately all light from the object bean to pass therethrough and to absorb approximately all light from the reference beam striking the absorber-blocker.

3. The system of claim 1, wherein the diffuser is an anisotropic diffuser.

4. The system of claim 1, wherein the diffuser further comprises a lenticular array.

5. The system of claim 1, wherein the absorber-blocker is formed on a surface of the diffuser.

6. The system of claim 1, wherein the absorber-blocker is formed on a substrate separate from the diffuser.

7. The system of claim 6, wherein the substrate is one of a plastic substrate and a glass substrate.

8. The system of claim 1, wherein at least two of the plurality of absorber-blocker material elements are arranged parallel to each other.

9. The system of claim 1, wherein the thin layer of material is absorptive at wavelengths being used for holographic recording.

10. The system of claim 9, wherein the thin layer of material is at least one of an absorptive ink, an absorptive paint, a plastic, and an exposed photoactive material.

11. The system of claim 9, wherein the absorber-blocker is fabricated such that the plurality of absorber-blocker material elements exists only where the object beam will not be incident on the absorber-blocker and will not exist where the object beam is incident upon the absorber-blocker.

12. The system of claim 1, wherein the absorber-blocker is located in a plane of minimum object beam area.

13. The system of claim 1, wherein multiple reference beams are directed at the first surface and multiple object beams are directed at the second surface for recording substantially full color holograms.

14. The system of claim 1, wherein multiple reference beams are directed at the first surface and multiple object beams are directed at the second surface for recording horizontal parallax only holograms.

15. The system of claim 1, wherein multiple reference beams are directed at the first surface and multiple object beams are directed at the second surface for recording full parallax holograms.

16. The system of claim 1 further comprising:
    a laser operable to provide a coherent light beam;
    a beam splitter disposed to split the coherent light beam into the reference beam and the object beam; and
    a spatial light modulator disposed between the holographic recording material and the beam splitter such that the object beam passes through the spatial light modulator.

17. The system of claim 16 wherein the spatial light modulator is a computer controlled liquid crystal display.

18. The system of claim 17 further comprising:
    a computer system coupled to the liquid crystal display and operable to provide image data to the liquid crystal display.

* * * * *